United States Patent [19]
Herzig et al.

[11] 3,755,728
[45] Aug. 28, 1973

[54] PULSED CHARGED ELECTROCHEMICAL TIMING CELLS AND METHOD OF OPERATING

[75] Inventors: Robert W. Herzig, North Adams; Warren J. Clement, Williamstown; Juris Zauls, Berkshire, all of Mass.

[73] Assignee: Sprague Electric Company, North Adams, Mass.

[22] Filed: Mar. 22, 1972

[21] Appl. No.: 236,843

[52] U.S. Cl............. 320/9, 320/14, 320/44, 320/DIG. 1, 324/94, 323/22 SC
[51] Int. Cl. .............................. H02j 7/00
[58] Field of Search........ 323/9, 22 SC, 45; 320/43, 44, 14, DIG. 1; 324/94

[56] References Cited
UNITED STATES PATENTS

| 3,428,894 | 2/1969 | Boettcher | 320/14 X |
| 3,564,382 | 2/1971 | King et al. | 320/44 X |
| 3,255,413 | 6/1966 | Marwell et al. | 320/14 X |
| 3,691,448 | 9/1972 | Milward | 320/43 |
| 3,710,225 | 1/1973 | Herzig | 320/9 |

Primary Examiner—Gerald Goldberg
Attorney—Vincent H. Sweeney

[57] ABSTRACT

A coulometer which is charged by a pulse charging method in an R-C network in series with the coulometer measures time by the passage of a known constant current through the cell so that when the current-time product has caused the transfer of a predetermined amount of active material in the coulometer an impedance transformation within the coulometer results in a voltage rise across the coulometer. The voltage rise applied across the input to a responsive means changes the potential at the input to change a negative output voltage of said responsive means to be changed to a positive output voltage. The output voltage change is substantially greater than the voltage rise in the coulometer.

The output voltage change triggers a gate mechanism to actuate a suitable control.

2 Claims, 1 Drawing Figure

PATENTED AUG 28 1973
3,755,728
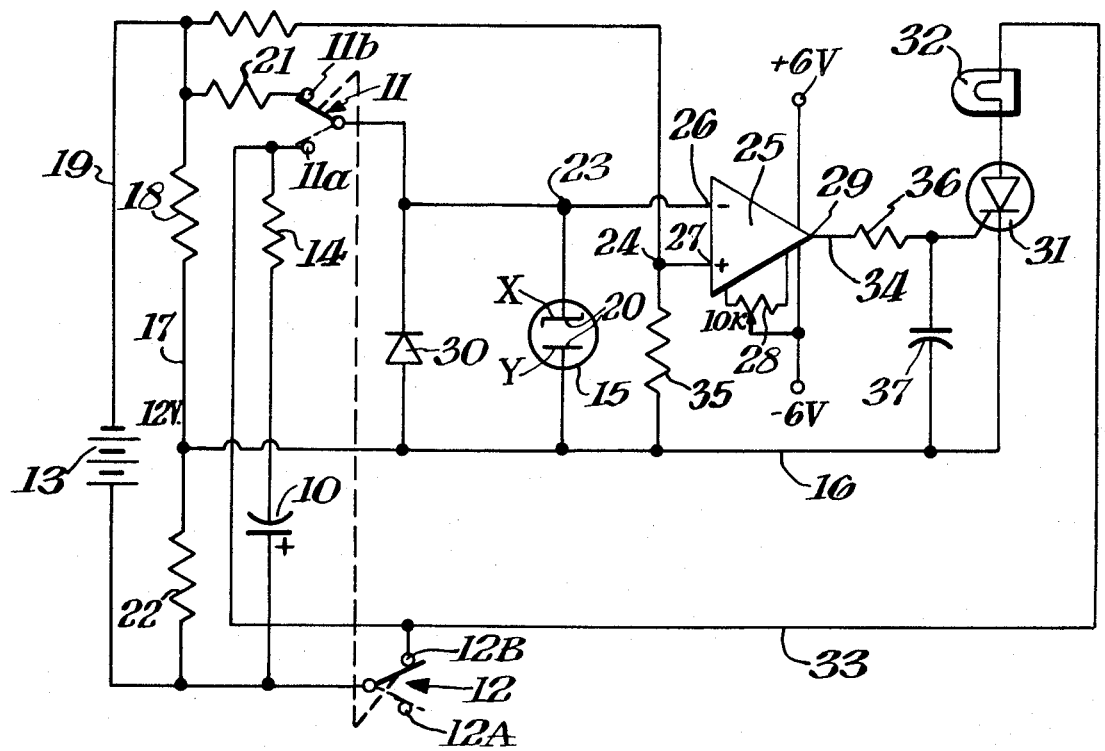

3,755,728

PULSED CHARGED ELECTROCHEMICAL TIMING CELLS AND METHOD OF OPERATING

BACKGROUND OF THE INVENTION

This invention relates to a system for measuring and controlling electric current during a period of time by the charge and discharge of electrochemical timing cells in which a pulse charging method uses an R-C network in series with a coulometer and more particularly to the actuating of a control by increased output voltage from the cell.

The pulse charging of a coulometer using an R-C network in series with the coulometer permits rapid charging times. The rapid charging time in turn makes it possible to charge up a coulometer in a relatively short time by passing a known current through the cell in a direction to build up the active material on one plate. After the timing cell is charged, the system can be used to control electric current and to measure time by passing a known constant current through the cell in the opposite direction from charging. When the current time product has reached a point of transferring a certain proportion of the active material from one plate to another in the cell, an impedance transformation takes place within the cell and the voltage drop across the cell rises substantially. The voltage drop produced at the cell is small.

One such method for controlling with an electrochemical cell and a capacitor involves connecting the capacitor and the cell in a circuit and as the capacitor is charged through the electro-chemical cell transferring the active material from one plate to another. When the known constant current is then applied across the cell in the opposite direction, the discharge times and controls in the manner described above. One of the problems encountered with this mechanism is the fact that the voltage drop across the coulometer is small.

In order to obtain quick and instantaneous charging of the coulometer cell, it is important that the time constant of the pulse charging circuit be made small. Consequently it is desirable that the potential change bringing about the triggering action at the end of the coulometer discharge is similarly small. Accordingly, it is advantageous to be able to bring about the triggering action with a small change in potential. But it is desirable that the voltage actuating the control means after coulometer discharge be substantially greater than the voltage rise.

SUMMARY OF THE INVENTION

It is an object of this invention to provide an apparatus for operating controls in a system using the method for pulse charging of an R-C network in series with a coulometer timing cell in which the voltage triggering the gating mechanism at the coulometer discharge is greater than the voltage rise in the coulometer at the end of the timing by the coulometer.

A further object of this invention is a timing system actuating a control through a change in voltage potential across the timing cell by which a small potential change results in an adequate triggering action.

This invention provides a means for providing a triggering action from impedance transformation in a coulometer which is obtained by applying the change in voltage potential to a voltage offset circuit which amplifies the potential change allowing a small potential change across the coulometer to be adapted into an improved triggering signal.

These and other objects of this invention will be more readily understood in the light of the following description taken together with the accompanying drawings in which the FIGURE illustrates a schematic diagram of an embodiment of this invention.

DESCRIPTION OF THE PREFERRED EMBODIMENT

Referring to the FIGURE a capacitor 10 is initially in a discharged position. On switching switches 11 and 12 to respective contacts 11A and 12A as shown in phantom line, the capacitor 10 is charged by connection across the battery 13. The time constant for the charging of capacitor 10 is dependent upon resistor 14 with the current flowing from battery 13 to the capacitor 10 and then to the resistor 14 through switch contact 11A and a coulometer 15 through line 16 and line 17 to resistor 18 and back to the battery 13 through line 19. The active material 20 in the coulometer 15 is moved from plate X to plate Y.

The time constant is substantially short so that the coulometer 15 is charged in the time that the switches are in the position shown in phantom line in the drawing and the active material 20 is moved to the plate Y in that time.

At this point the switches 11 and 12 return to normal position in contact with contacts 11B and 12B and the discharge of the coulometer 15 starts to move the active material 20 to the plate X. The discharge current is through the switch contact 11B of switch 11, resistor 21, line 19, battery 13, resistor 22 and line 16 back to the coulometer 15.

When the coulometer discharges, the heretofore relatively low negative potential from point 23 to point 24 is rapidly increased by an impedance transformation in the coulometer 15 to produce a negative voltage rise between 23 and 24.

The voltage rise provided by the impedance transformation in coulometer 15 is small. A conventional differential operational amplifier 25 is connected to points 23 and 24 with point 23 connected to input 26 of amplifier 25 and point 24 connected to input 27 of amplifier 25. While the coulometer 15 is discharging, the conventional offset circuit of the amplifier 25 is adjusted by means of a potentiometer 28 to offset the input 27 and 26 such that a minus voltage is obtained at output 29.

When the negative voltage rise at points 23 and 24 is applied between the inputs 26 and 27, the input 26 is raised to input 27. The amplifier 25 then reverses, the output voltage at output 29 changes from minus to plus to provide a positive voltage. This voltage change at output 29 may be of the order of two or more volts. This is substantially greater than the voltage rise in the pulse charged coulometer of this invention.

The output from the circuit 25 causes a current through line 34 with a controlled rectifier 31 closing the circuit through lamp 32 and through line 33 and switch 12 to the battery 13, then through line 19, resistor 18 and line 16 back to the rectifier 31.

For the purpose of the illustration only, the following is an example of representative values in an embodiment of this invention.

| | |
|---|---|
| Battery 13 | 12 volts |
| Resistor 14 | 300 ohms |

| | |
|---|---|
| Resistor 18 | 25 ohms, 2 watts |
| Resistor 22 | 25 ohms, 2 watts |
| Circuit 25 | Operational Amplifier ULN-2151D Sprague Electric Co. |
| Diode 30 | 1N560 |
| Rectifier 31 | C106B1 |
| Resistor 35 | 40 kilohms |
| Resistor 36 | 220 kilohms |
| Capacitor 37 | 0.01 μf |

After the discharge any residual active material transferred from plate Y to plate X is prevented by current flow through diode 30. Diode 30 is connected in parallel with the coulometer 15.

It will be understood that the capacitor 10 is selected depending upon the time of charge desired and may even be variable to permit adjustment. The discharge period which is determined by the resistance in the discharge path is made up in the illustrated embodiment of the resistor 21.

Among other advantages this circuit provides a means for setting a timing charge immediately preceding the timing operation with great accuracy and a great range in variations of the time period. Further the means is simple and inexpensive and avoids the complexity of prior devices. Particularly the device of this invention avoids excessive current.

What is claimed is:

1. An electrical timing system comprising an electrochemical coulometer cell; and R-C network for charging said cell, said cell exhibiting an impedance transformation at the completion of said discharging and a rise in voltage appearing across said cell as a consequence of said impedance transformation; a differential amplifier for detecting and amplifying said voltage rise; a voltage sensitive trigger being connected to the output of said amplifier; and a variable means for voltage offsetting said voltage rise such that said trigger is responsive to said voltage rise.

2. The system of claim 1 wherein said differential amplifier consists in a conventional operational amplifier, and the conventional input voltage offset circuits normally associated with said operational amplifier comprise said voltage offsetting means.

* * * * *